US012535429B2

(12) United States Patent
Hutfilz et al.

(10) Patent No.: US 12,535,429 B2
(45) Date of Patent: Jan. 27, 2026

(54) SYSTEM AND METHOD FOR A JEWELRY VIEWING STAND

(71) Applicant: STERLING JEWELERS INC., Akron, OH (US)

(72) Inventors: Stephen Hutfilz, Akron, OH (US); Sean Kelley, Parma, OH (US); Stephen Maillard, Copley, OH (US); Tenielle Mccarron, Massillon, OH (US); Natalie R. Mallinak, Akron, OH (US); Richard Smith, Medina, OH (US); Brad Yarris, Medina, OH (US); Rachel Weber, Cuyahoga Falls, OH (US); Maie Amer-Guerrera, Southlake, TX (US)

(73) Assignee: STERLING JEWELERS INC., Akron, OH (US)

( * ) Notice: Subject to any disclaimer, the term of this patent is extended or adjusted under 35 U.S.C. 154(b) by 197 days.

(21) Appl. No.: 18/495,088

(22) Filed: Oct. 26, 2023

(65) Prior Publication Data

US 2024/0142385 A1    May 2, 2024

Related U.S. Application Data

(60) Provisional application No. 63/419,646, filed on Oct. 26, 2022.

(51) Int. Cl.
*G01N 21/87* (2006.01)

(52) U.S. Cl.
CPC ..... *G01N 21/87* (2013.01); *G01N 2201/0221* (2013.01); *G01N 2201/0225* (2013.01)

(58) Field of Classification Search
CPC .......... G01N 21/87; G01N 2201/0221; G01N 2201/0225
See application file for complete search history.

(56) References Cited

U.S. PATENT DOCUMENTS

| 2,624,535 A |   | 1/1953  | Bollhoefer |            |
|-------------|---|---------|------------|------------|
| 5,828,405 A | * | 10/1998 | Vanier     | G01N 33/389 |
|             |   |         |            | 348/161    |

(Continued)

FOREIGN PATENT DOCUMENTS

| CN | 105784697 A | * | 7/2016 | ............. G01N 21/78 |
| CN | 210488084 U | * | 5/2020 |                          |

(Continued)

OTHER PUBLICATIONS

"International Search Report and Written Opinion of the International Searching Authority," issued in connection with Int'l Appl. No. PCT/US2023/77951, dated Feb. 14, 2024 (12 pages).

(Continued)

*Primary Examiner* — Hina F Ayub
(74) *Attorney, Agent, or Firm* — Quarles & Brady LLP

(57) ABSTRACT

A jewelry viewing stand including a stand, an imaging device, and an adjustable base is provided. The imaging device is configured to image a piece of jewelry and the stand is configured to hold and position the imaging device. The adjustable base is attached to the stand and positioned beneath the imaging device. The adjustable device is configured to move a piece of jewelry vertically toward and away from the imaging device while the stand maintains the imaging device in a stable, stationary position.

16 Claims, 7 Drawing Sheets

(56) References Cited

U.S. PATENT DOCUMENTS

| | | | |
|---|---|---|---|
| 6,187,213 B1* | 2/2001 | Smith | B23K 26/066 |
| | | | 216/81 |
| 11,280,744 B2 | 3/2022 | Yamada | |
| 11,327,026 B1 | 5/2022 | Castoro et al. | |
| 2016/0320312 A1 | 11/2016 | Kolomenkin et al. | |
| 2017/0322082 A1* | 11/2017 | Li | G01N 33/389 |
| 2020/0173930 A1 | 6/2020 | Alonie et al. | |
| 2020/0340927 A1 | 10/2020 | Balagurusamy et al. | |
| 2021/0270746 A1* | 9/2021 | Yehuda | G01N 21/87 |

FOREIGN PATENT DOCUMENTS

| | | |
|---|---|---|
| CN | 214744280 U | 11/2021 |
| WO | 2015130342 A1 | 9/2015 |
| WO | 2015132785 A1 | 9/2015 |

OTHER PUBLICATIONS

Patent Search Report for Camera Stand for Jewelry, prepared by Brian Hameder, dated Sep. 26, 2022, 20 pages.

\* cited by examiner

SYSTEM AND METHOD FOR A JEWELRY VIEWING STAND

CROSS-REFERENCE TO RELATED APPLICATION

This application claims the benefit of U.S. Provisional Patent Application No. 63/419,646, entitled "SYSTEM AND METHOD FOR A JEWELRY VIEWING STAND," filed on Oct. 26, 2022, which is specifically incorporated by reference for all it discloses and teaches.

BACKGROUND OF CERTAIN ASPECTS OF THE DISCLOSURE

In various situations, close inspection of jewelry is required by a jeweler or customer. For example, purchasing or repairing jewelry typically includes a close inspection of the jewelry to determine whether to buy the jewelry or how to repair the jewelry. Or, in another example, close inspection is required for identification for purposes of chain of custody. Specifically, a potential buyer or a jeweler may use a jeweler's loupe or gemscope to examine the jewelry to determine its worth, how to repair it, or to identify a particular piece. However, a jeweler's loupe or gemscope can only be used by a single person and jewelers may want to display close up images of the jewelry, for example, to explain aspects of the jewelry to potential buyers. Additionally, at least some known jewelry viewing stands do not include all components in a compact, easy to move unit. Furthermore, at least some known jewelry viewing stands do not enable the jeweler and the potential buyer to view close up images simultaneously in order to enable the jeweler to explain aspects of the jewelry to the buyer.

Accordingly, there is a need for a compact, portable jewelry stand that enables close up images of the jewelry.

BRIEF SUMMARY OF SOME ASPECTS OF THE DISCLOSURE

A number of embodiments of a jewelry viewing stand and a method of viewing jewelry, are presented in this application. The embodiments described herein include a jewelry viewing stand including a stand, an imaging device, and an adjustable base. In some embodiments, the imaging device may be a tablet or a phone. The imaging device is configured to image a piece of jewelry and the stand is configured to hold and position the imaging device. The adjustable base is attached to the stand and positioned beneath the imaging device. The adjustable base is configured to move a piece of jewelry vertically toward and away from the imaging device while the stand maintains the imaging device in a stable, stationary position.

The embodiments described herein also include a jewelry viewing stand including a stand including a clamp, an imaging device, and an adjustable base. The imaging device is configured to image a piece of jewelry and the clamp is configured to hold and position the imaging device. In some embodiments, the imaging device includes a tablet. The adjustable base is attached to the stand and positioned beneath the imaging device. The adjustable device is configured to move a piece of jewelry vertically toward and away from the imaging device while the clamp maintains the imaging device in a stable, stationary position.

The embodiments described herein also include a method of viewing jewelry. The method includes providing a jewelry viewing stand including a stand including a clamp, an imaging device, and an adjustable base attached to the stand. The method further includes pulling open the clamp and positioning the imaging device in the clamp. The method also includes positioning a piece of jewelry on the adjustable base and beneath the imaging device. The method further includes vertically adjusting a position of the adjustable base such that the piece of jewelry is moved up toward the imaging device or down away from the imaging device. The method also includes imaging the piece of jewelry using the imaging device.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are disclosed in association with the accompanying drawings in which.

DETAILED DESCRIPTION

A number of embodiments of a system and method for a jewelry viewing stand are presented in this application. In general, the jewelry viewing stand enables a user to closely inspect and view jewelry. For example, the jewelry viewing stands described herein may enable a jewelry retailer to display jewelry to a potential buyer in great detail. Additionally, the jewelry viewing stands described herein may also enable a jeweler that repairs jewelry to closely inspect jewelry to determine how best to repair the jewelry. In other uses, the jewelry viewing stands described herein may also be used to maintain a chain of custody for diamond identification and appraisal. Specifically, the jewelry viewing stand may be used to capture characteristics of gems or a diamond laser inscription (e.g., a Gemscribe diamond laser inscription) that enables a diamond to be identified and/or appraised or a chain of custody of the diamond maintained. In some cases, the jewelry viewing stands described herein may also be used to plot and document inclusions to create a digital "fingerprint" of a diamond by capturing different characteristics. Other viewing uses are contemplated. Accordingly, the jewelry viewing stands described herein may enable jewelers, other jewelry professionals, and consumers to inspect, view, and display jewelry in a unique manner.

Specifically, in some embodiments, the jewelry viewing stand includes a stand, a platform base, an adjustable platform, an imaging device, and at least one insertable pad. In some embodiments, the stand includes a drawer for containing some of the components of the jewelry stand and a clamp positioned on top of the drawer for holding the imaging device in place above the platform base, the adjustable platform, and the insertable pad. The imaging device can allow a user to view jewelry or take close up pictures or videos of jewelry that has been placed in the insertable pad beneath the imaging device. The adjustable platform is moved up and down to focus on an image to improve the sharpness of the view, pictures, or videos. The pictures or videos are then viewed by the jeweler and/or potential buyer. In the retail setting, the viewing, pictures or videos enable the buyer to examine the clarity, cut, carat, and color of gems of the jewelry, improving the buyer's appreciation of the jewelry and increasing the likelihood of a sale. In the repair setting, the viewing, pictures or videos enable the jeweler to closely inspect the jewelry and quickly determine how best to proceed with repairs.

Figure 1:
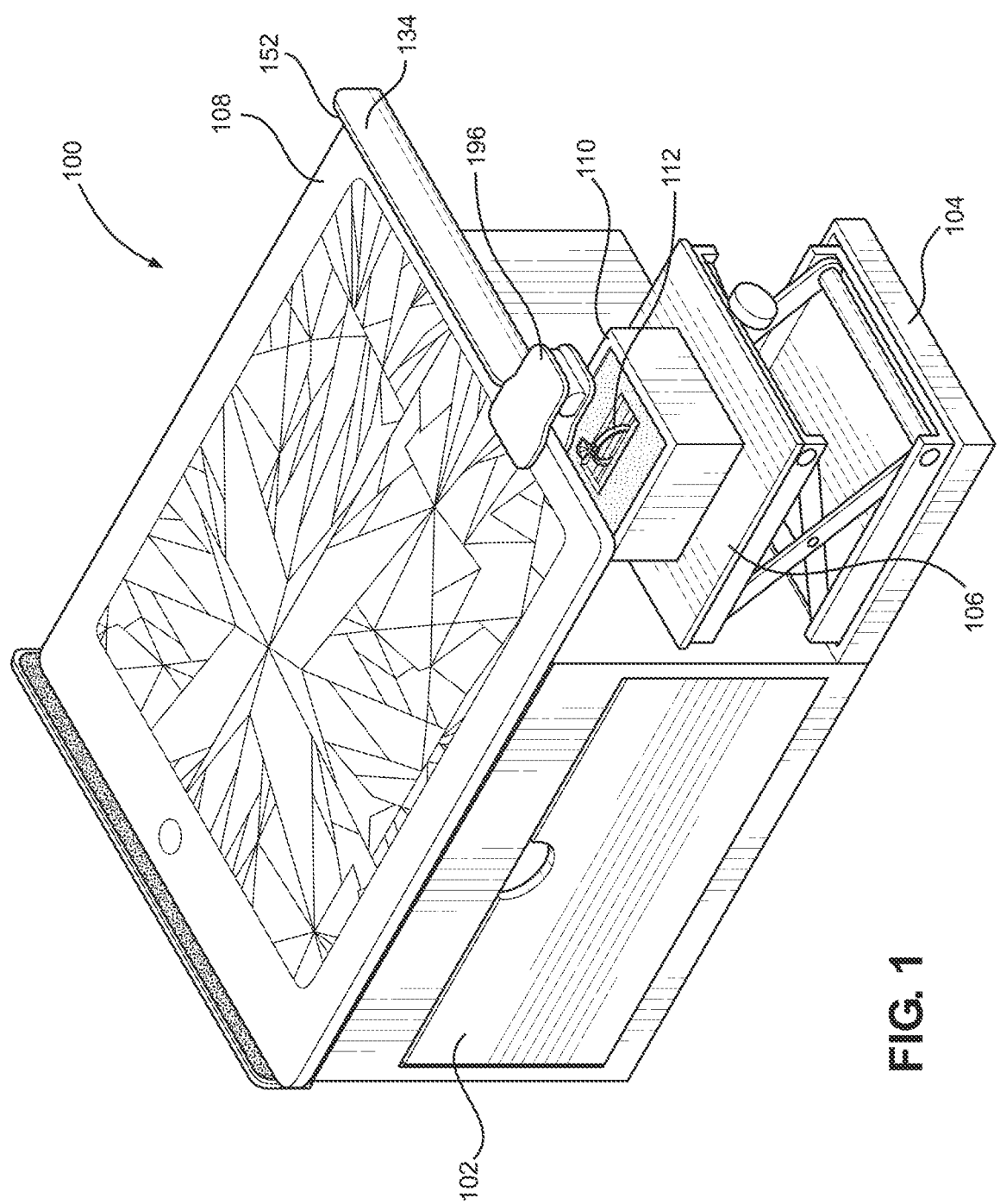
FIG. 1 illustrates a perspective view of a jewelry viewing stand in accordance with aspects of the present disclosure.
Figure 2:
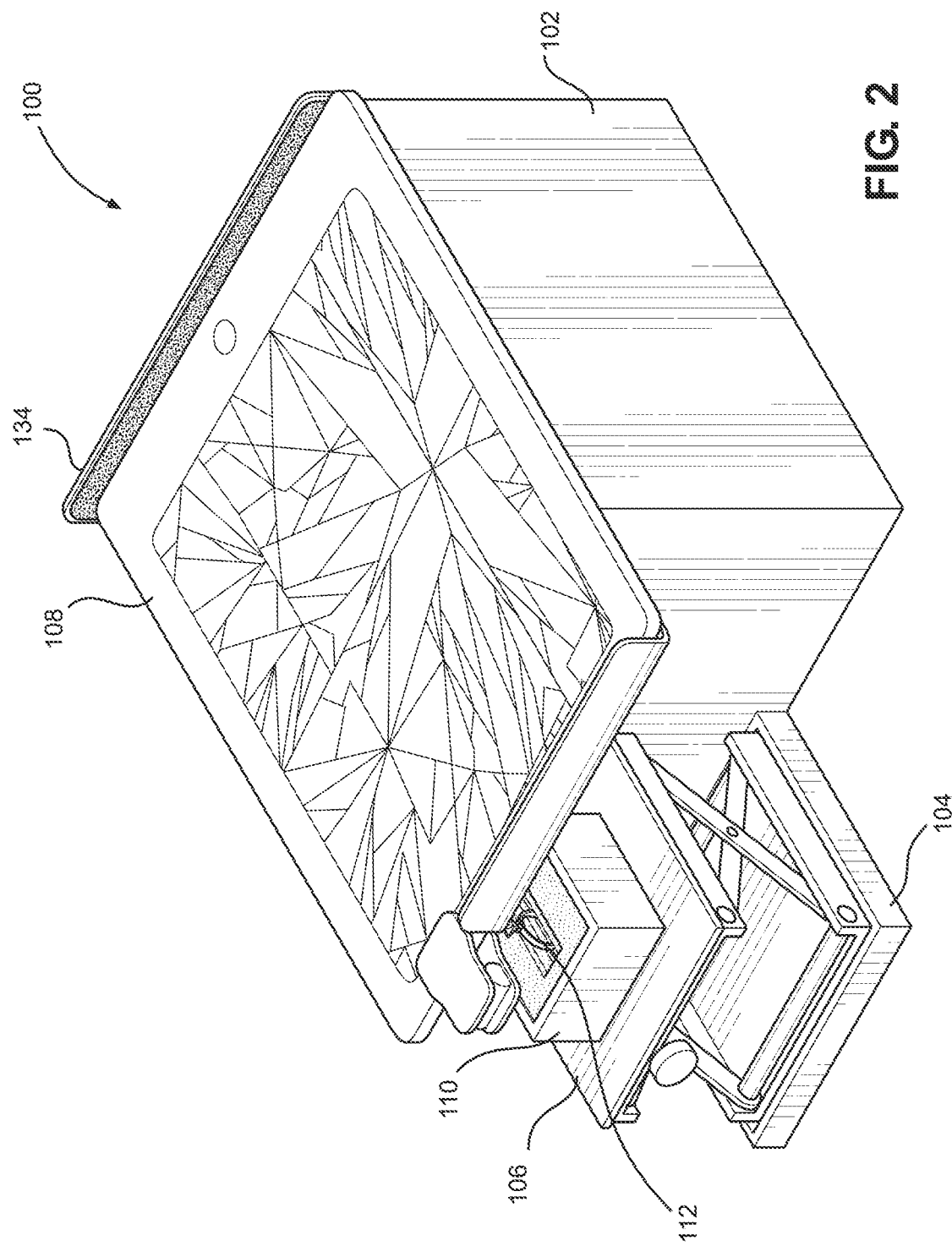
FIG. 2 illustrates another perspective view of the jewelry viewing stand illustrated in FIG. 1 in accordance with aspects of the present disclosure.

FIG. 1 is a perspective view of a jewelry viewing stand 100. FIG. 2 is another perspective view of the jewelry viewing stand 100. In the illustrated embodiment, the jewelry viewing stand 100 includes a stand 102, a platform base 104, an adjustable platform 106, an imaging device 108, and at least one jewelry tray 110. The stand 102 holds and supports the imaging device 108 in a stable, stationary position above the platform base 104, the adjustable platform 106, and the jewelry tray 110. The platform base 104 is attached to the stand 104, and the adjustable platform 106 is attached to and positioned on top of the platform base 106. The jewelry tray 110 is configured to hold or contain jewelry 112 and is removably positioned on the adjustable platform 106 beneath the imaging device 108. The imaging device 108 is configured to provide viewing or take close up pictures or videos of the jewelry 112. The adjustable platform 106 is configured to move up and down to improve the view, pictures, or videos. As discussed above, the pictures or videos are then viewed by the jeweler and/or potential buyer to increase sales of jewelry and improve repairs of jewelry.

Figure 3:
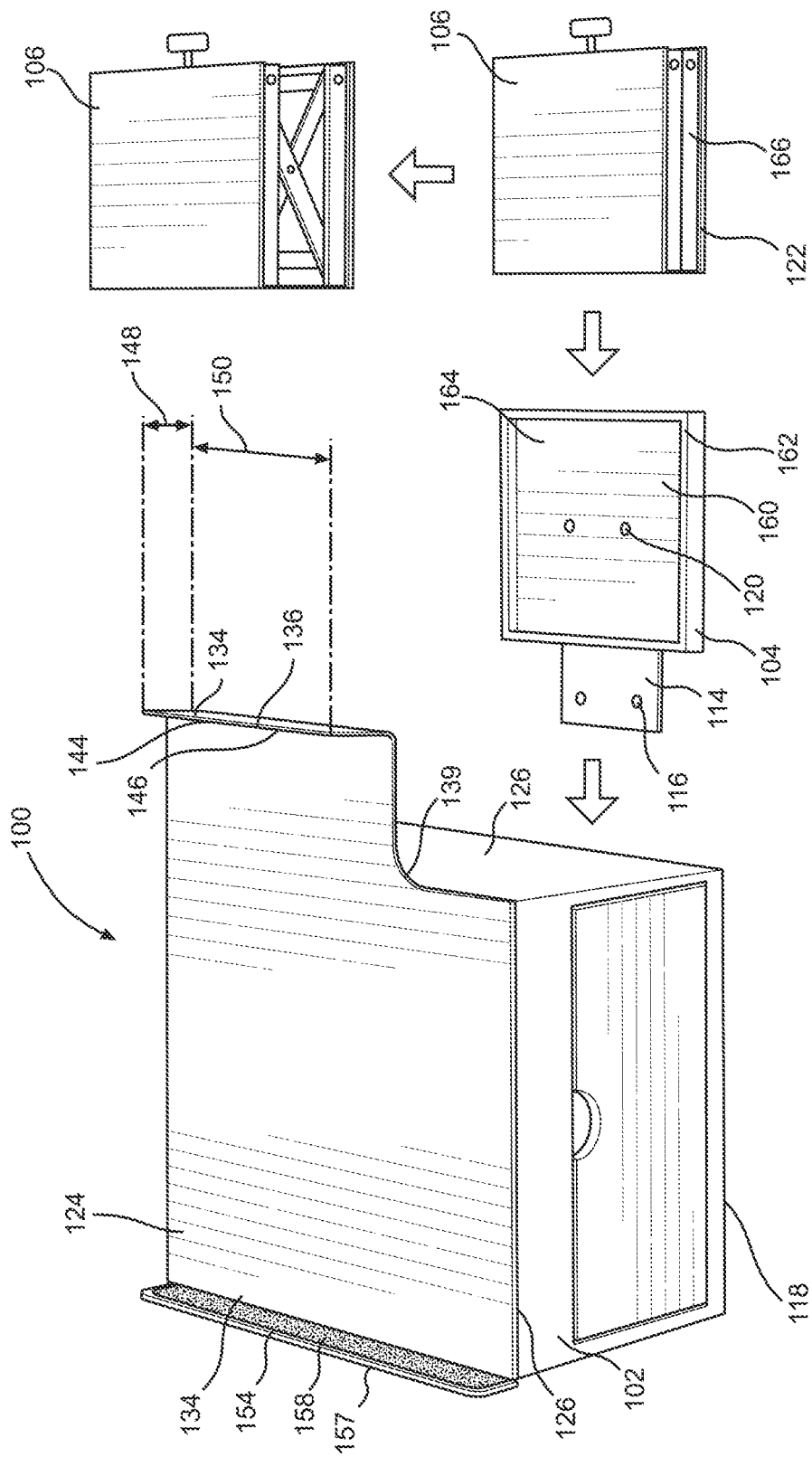
FIG. 3 illustrates an exploded perspective view of portions of the jewelry viewing stand illustrated in FIGS. 1 and 2 in accordance with aspects of the present disclosure.

FIG. 3 illustrates an exploded perspective view of portions of the jewelry viewing stand 100. The platform base 104 includes an attachment tab 114 including a first set of fastener holes 116 and the stand 102 also includes corresponding stand fastener holes (not shown) defined in a bottom 118 of the stand 102. Fasteners (not shown), including but not limited to screws, nails, and/or any other type of fastener, are inserted into the first set of fastener holes 116 and the stand fastener holes to attach the platform base 104 to the stand 102. Additionally, the platform base 104 further includes a second set of fastener holes 120 and the adjustable platform 106 also includes corresponding adjustable platform fastener holes (not shown) defined in a bottom 122 of the adjustable platform 106. Fasteners (not shown), including but not limited to screws, nails, and/or any other type of fastener, are inserted into the second set of fastener holes 120 and the adjustable platform fastener holes to attach the platform base 104 to the adjustable platform 106.

As shown in FIGS. 1 and 2, once the platform base 104 has been attached to the stand 102 and the adjustable platform 106 has been attached to the platform base 104, the remainder of the jewelry viewing stand 100 is assembled as shown in FIGS. 1 and 2. Specifically, the imaging device 108 is positioned on the stand 102, the jewelry 112 is positioned in or on the jewelry tray 110, and the jewelry 112 and the jewelry tray 110 are positioned on the adjustable platform 106 and beneath the imaging device 108. The imaging device 108 then images the jewelry 112 as described herein.

Figure 4:
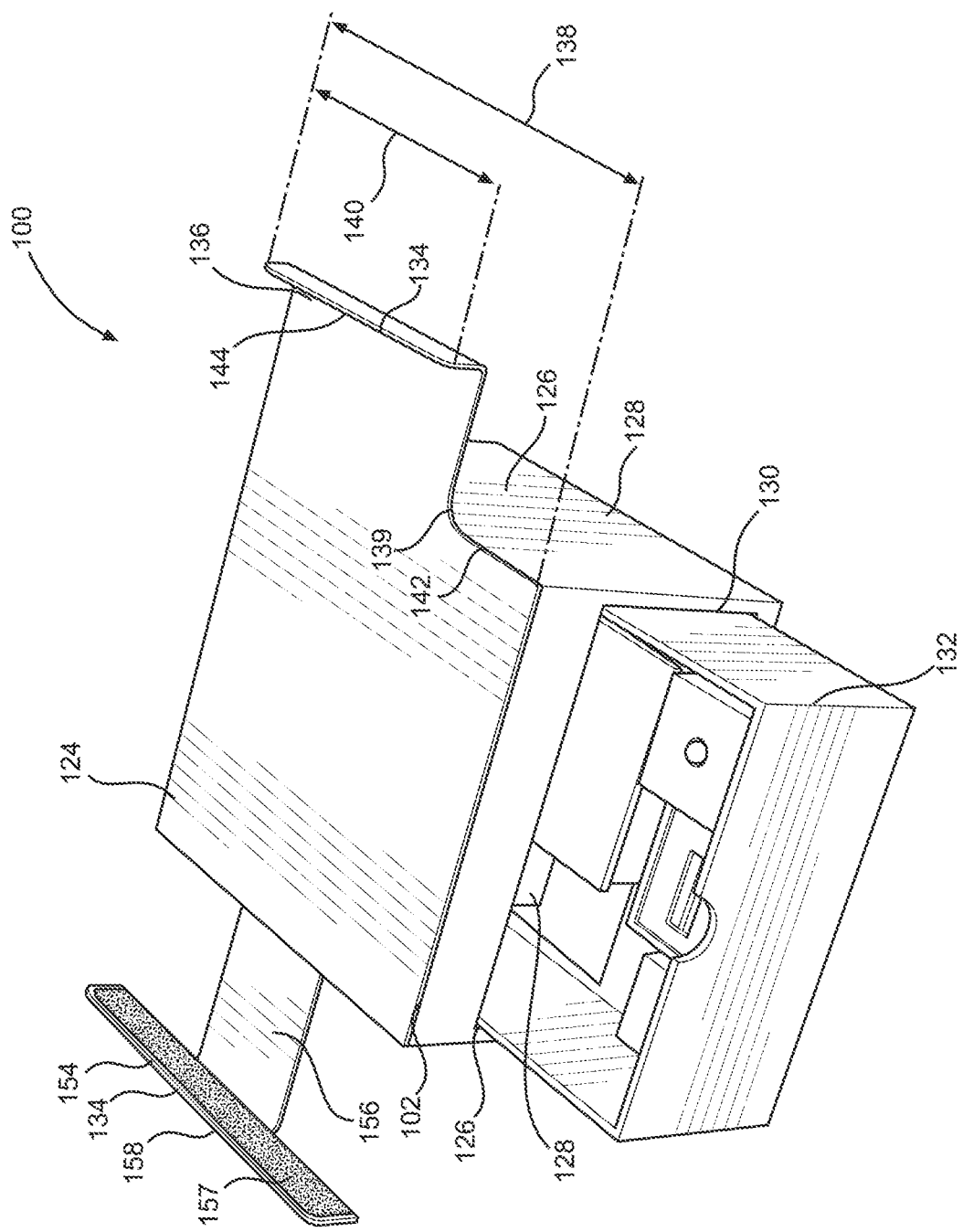
FIG. 4 illustrates a perspective view of a stand of the jewelry viewing stand illustrated in FIGS. 1 and 2 in accordance with aspects of the present disclosure.

FIG. 4 illustrates a perspective view of the stand 102. The stand 102 includes the bottom 118, a top 124, and sides 126 formed in a rectangular prism shape that defines a cavity 128. One of the sides 126 defines an opening 130 and a drawer 132 is removably positioned within the cavity 128 and the opening 130. Specifically, the drawer 132 is configured to slide into and out of the cavity 128 and the opening 130 and the drawer 132 is configured to store equipment such as the insertable pads 110.

The top 124 defines a clamp 134 that is configured to hold the imaging device 108 above the jewelry 112, the platform base 104, the adjustable platform 106, and the jewelry tray 110. In the illustrated embodiment, the clamp 134 includes a spring actuated clamp that is configured to clasp the imaging device 108 such that portions of the clamp 134 form a friction fit on the imaging device 108 such that the imaging device 108 is maintained in position above the jewelry 112, the platform base 104, the adjustable platform 106, and the jewelry tray 110. In alternative embodiments, the clamp 134 may be any type of clamp or clasping device that enables the jewelry viewing stand 100 to operate as described herein. For example, in alternative embodiments, the clamp 134 may include a screw clamp, a quick action clamp, and/or any other type of clamp.

The top 124 of the stand 102 includes a clamp stationary jaw 136 extending from the top 124 of the stand 102 and integrally formed with the stand 102. Specifically, in the illustrated embodiment, the clamp stationary jaw 136 extends from an intersection 139 of a side 126 of the stand 102 and the top 124 of the stand 102 and is co-planar with the top 124 of the stand 102 such that the clamp stationary jaw 136 seamlessly extends from the top 124 of the stand 102. As such, the clamp stationary jaw 136 defines a first, stationary jaw of the clamp 134. As shown in FIG. 4, the side 126 has a side length 138 and the clamp stationary jaw 136 has a clamp stationary jaw length 140. The side length 138 is greater than the clamp stationary jaw length 140 such that the top 124 and the clamp stationary jaw 136 define an imaging device notch 142 configured to receive at least a portion of the imaging device 108. As shown in FIGS. 1 and 2, the imaging device notch 142 enables the imaging device 108 to view the jewelry 112 while also being supported by the top 124 and the clamp stationary jaw 136.

The clamp stationary jaw 136 includes a clamp stationary jaw lip 144 extending vertically from an end 146 of the clamp stationary jaw 136. The clamp stationary jaw lip 144 is at least partially configured to clasp the imaging device 108 and is sized and shaped to clasp the imaging device 108. For example, the clamp stationary jaw lip 144 has a clamp stationary jaw lip height 148 and a clamp stationary jaw lip width 150 that are configured to retain the imaging device 108 on the top 124 of the stand 102. For example, in the illustrated embodiment, the clamp stationary jaw lip height 148 is about ¾ inches to about ⅞ inches and the clamp stationary jaw lip width 150 is about 5 inches. In alternative embodiments, the clamp stationary jaw lip height 148 and the clamp stationary jaw lip width 150 may be any length that enables the clamp 134 to operate as described herein. Additionally, the clamp stationary jaw lip 144 includes a cushion 152 that is configured to protect the imaging device 108 in the clamp 134.

The clamp 134 also includes a clamp movable jaw 154 at least partially positioned in the stand 102 and configured to be adjustable to selectively clasp the imaging device 108. In the illustrated embodiment, the clamp movable jaw 154 includes a clamp movable jaw arm 156, a clamp movable jaw lip 157, a cushion 158, and a clamp actuation mechanism (not shown). The clamp actuation mechanism is positioned within the stand 102 and is configured to actuate the clamp movable jaw 156 such that the clamp movable jaw 156 and the clamp stationary jaw 136 clasp the imaging device 108. Specifically, in the illustrated embodiment, the clamp actuation mechanism includes a spring mechanism configured to automatically actuate or move the clamp movable jaw 156 toward the clamp stationary jaw 136. More specifically, in the illustrated embodiment, the clamp actuation mechanism includes two guiderails (not shown) affixed to the underside of the top 124 to receive the clamp moveable jaw arm 156 and allow it to slide in one direction when retracted and the opposite direction when extended. The end (not shown) of the moveable jaw arm 156 is bent at a 90-degree angle and two L-shaped notches (not shown) are cut to secure the ends of two helical extension springs (not shown). The other ends of these helical extension springs are attached to an L-shaped bracket (not shown) affixed to the underside of the top 124 with two L-shaped notches (not shown) used to secure the springs. In alternative embodiments, the clamp actuation mechanism may include any mechanism that enables the clamp movable jaw 154 to operate as described herein.

As shown in FIG. 4, the cushion 158 is attached to the clamp movable jaw lip 157 and the clamp movable jaw lip 157 is attached to the clamp movable jaw arm 156. The clamp movable jaw arm 156 extends into the stand 102 and is movably attached to the clamp actuation mechanism. The clamp actuation mechanism is configured to actuate or move the clamp movable jaw arm 156 to enable the clamp movable jaw 156 and the clamp stationary jaw 136 to clasp the imaging device 108. More specifically, the clamp actuation mechanism is configured to pull the clamp movable jaw arm 156 into the stand 102 such that the clamp movable jaw 154 automatically moves toward the clamp stationary jaw 136 to clasp the imaging device 108. The cushion 158 is configured to protect the imaging device 108 in the clamp 134. In the illustrated embodiment, the clamp 134 is configured to secure imaging devices 108 that are approximately 240 millimeters (mm) to approximately 320 mm wide. In the illustrated embodiments, the imaging device 108 includes a table including a camera that is approximately 240 mm to approximately 320 mm wide. Other, smaller imaging devices 108 may be placed on the top 124 such that the imaging device 108 is placed partially over the imaging device notch 142. However, the smaller imaging device 108 is not secured in the clamp 134. Thus, the stand 102 is capable of accommodating other, smaller imaging devices 108 such as phones and convertible laptops.

Figure 5:
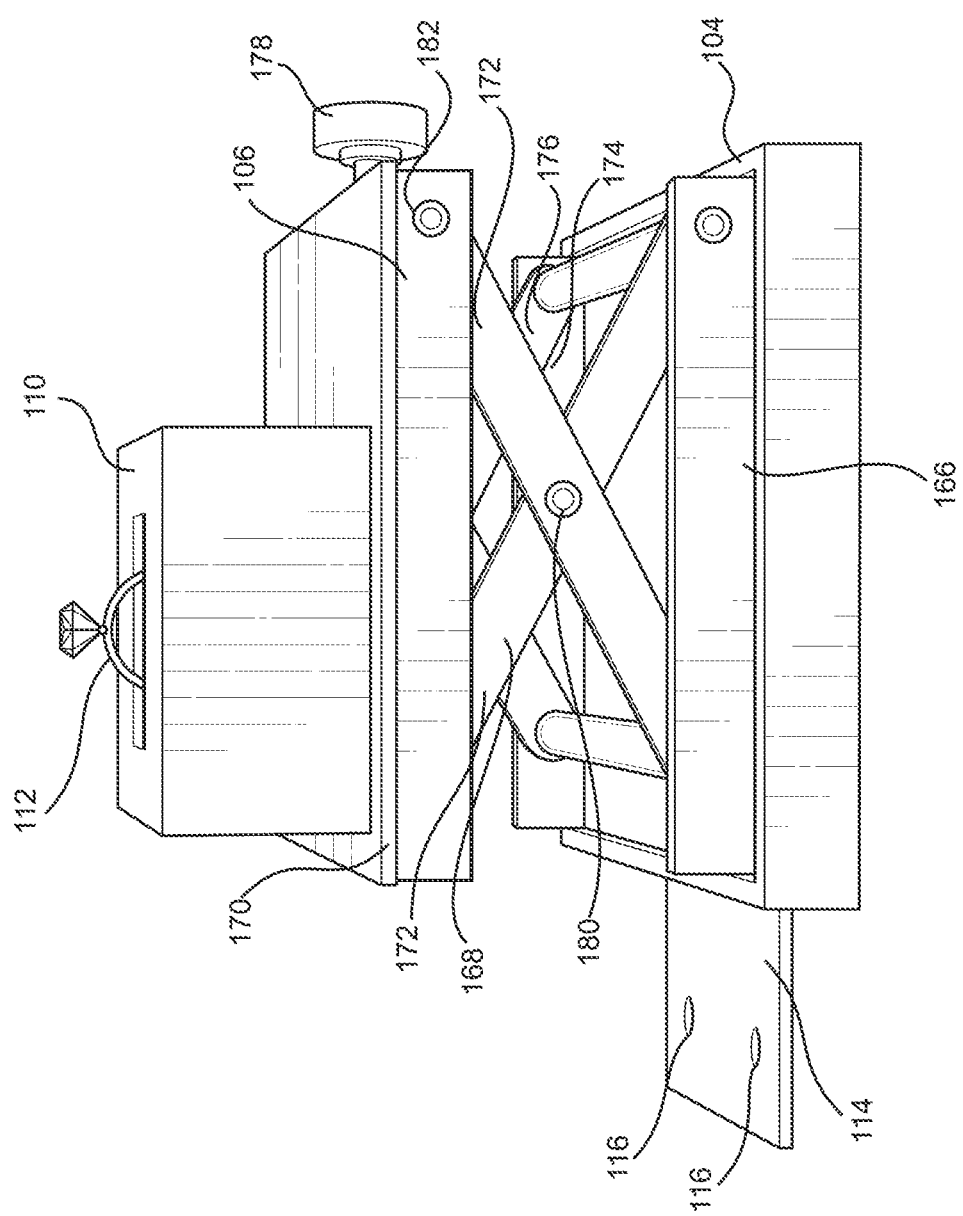
FIG. 5 illustrates a perspective view of a platform base, an adjustable platform, an insertable pad, and a jewelry of the jewelry viewing stand illustrated in FIGS. 1 and 2 in accordance with aspects of the present disclosure.

FIG. 5 illustrates a perspective view of the platform base 104, the adjustable platform 106, the jewelry tray 110, and the jewelry 112. The platform base 104 includes a substantially flat platform 160 that is attached to the stand 102 and the adjustable platform 106 to enable the adjustable platform 106 to be attached to the stand 102. The platform base 104 includes a platform base lip 162 that defines a platform base cavity 164 that is configured to at least partially receive the adjustable platform 106. As described above, the attachment tab 114 attaches the platform base 104 to the stand 102. The adjustable platform 106 is positioned in the platform base cavity 164 and attached to the platform base 104 to attach the adjustable platform 106 to the stand 102.

The adjustable platform 106 includes an adjustable platform base 166, a lifting mechanism 168, and an adjustable platform top platform 170. The adjustable platform base 166 is configured to be attached to the platform base 104 as described above. The lifting mechanism 168 is attached to the adjustable platform base 166 and the adjustable platform top platform 170 and is configured to move or lift the adjustable platform top platform 170. The adjustable platform top platform 170 is configured to support the jewelry tray 110 and/or the jewelry 112.

In the illustrated embodiment, the lifting mechanism 168 includes a scissor lift mechanism. Specifically, in the illustrated embodiment, the scissor lift mechanism includes scissor legs that move up and down to move or lift the adjustable platform top platform 170. More specifically, in the illustrated embodiment, the lifting mechanism 168 includes scissor legs 172 and a power source 174 configured to actuate or move the scissor legs 172. In the illustrated embodiment, the power source 174 is a screw mechanism 176 including an adjustable knob 178. The adjustable knob 178 is configured to actuate the screw mechanism 176 and the screw mechanism 176 is configured to actuate or move the scissor legs 172. In the illustrated embodiment, the adjustable knob 178 includes a rotatable knob. In alternative embodiments, the adjustable knob 178 may include any input (mechanical or electrical) that actuates the lifting mechanism 168. For example, the adjustable knob 178 may include a lever, a button, a switch, and/or any other actuation mechanism. The scissor legs 172 are configured to move or lift the adjustable platform top platform 170. In alternative embodiments, the lifting mechanism 168 may include any type of lifting mechanism that enables the jewelry viewing stand 100 to operate as described herein. For example, in some embodiment, the lifting mechanism 168 may include a powered lifting mechanism such as, but not limited to, an electric lifting mechanism, a hydraulic lifting mechanism, and/or a pneumatic lifting mechanism and the adjustable knob 178 may actuate the powered lifting mechanism.

The scissor legs 172 extend from the adjustable platform base 166 to the adjustable platform top platform 170. The scissor legs 172 are arranged in a pantograph or crisscross pattern and are pivotably attached to each other at a midpoint 180 of each scissor leg 172. The scissor legs 172 move in a scissor movement where ends 182 of each scissor leg 172 move toward each other as the adjustable platform top platform 170 is lifted and move apart as the adjustable platform top platform 170 is lowered. That is, the scissor legs 172 raise the adjustable platform top platform 170 as the scissor legs 172 constrict and lower the adjustable platform top platform 170 as the scissor legs 172 expand.

In an alternative embodiment, the adjustable platform 106 may be configured to move vertically and horizontally. For example, the lifting mechanism 168 may be configured to move the adjustable platform 106 both vertically and horizontally. As such, the lift mechanism 168 may include any type of movement mechanism that is configured to move the adjustable platform 106 both vertically and horizontally. In some embodiments, the adjustable platform 106 may be moved vertically and horizontally such that the adjustable platform 106 is oriented at an angle relative to the imaging device 108.

Figure 6:
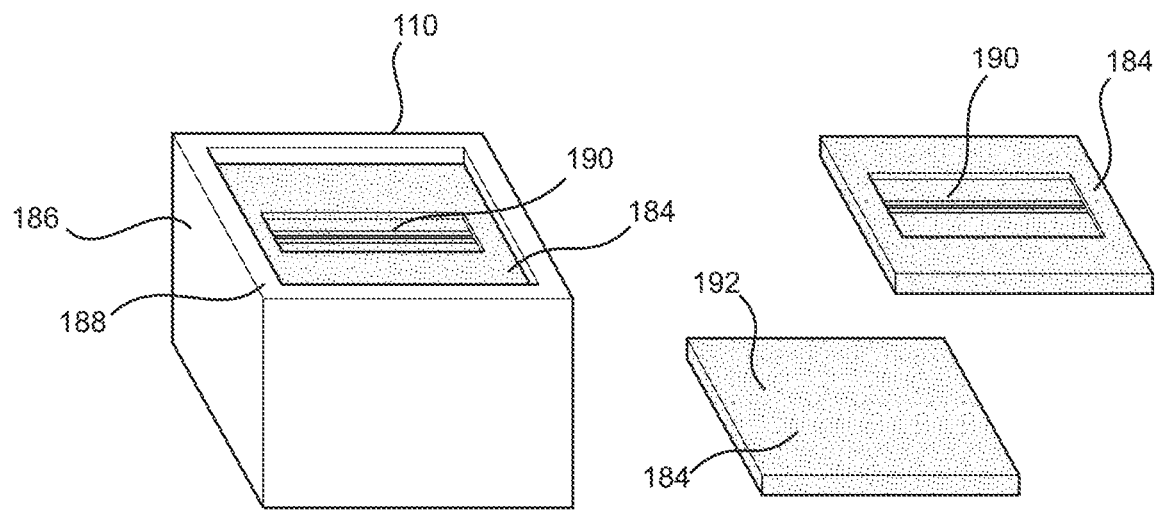
FIG. 6 illustrates a perspective view of a jewelry tray and a plurality of interchangeable pads of the jewelry viewing stand illustrated in FIGS. 1 and 2 in accordance with aspects of the present disclosure.
Figure 7:
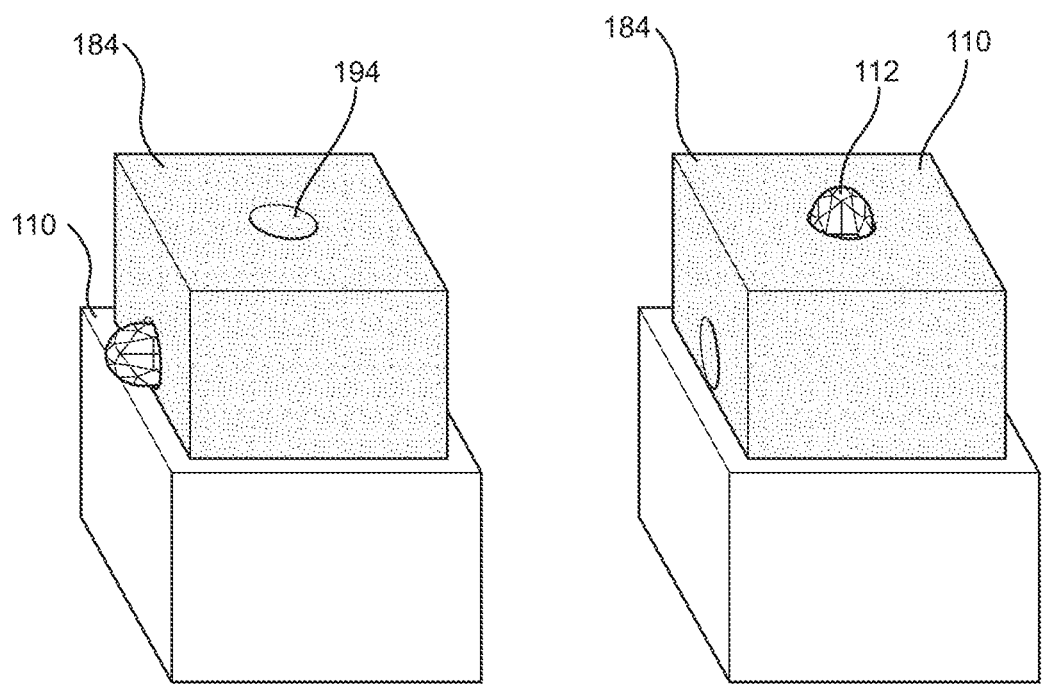
FIG. 7 illustrates another perspective view of the jewelry tray and the interchangeable pads of the jewelry viewing stand illustrated in FIGS. 1 and 2 in accordance with aspects of the present disclosure.

FIG. 6 illustrates a perspective view of the jewelry tray 110 and a plurality of interchangeable pads 184. FIG. 7 illustrates another perspective view of the jewelry tray 110 and the interchangeable pads 184. As shown in FIGS. 6 and 7, the jewelry tray 110 includes a box 186 defining an open top 188 that is configured to receive an interchangeable pad 184. Each interchangeable pad 184 is configured to hold a specific type of jewelry 112 in a configuration that is easily viewable by the imaging device 108. For example, in some embodiments, the interchangeable pads 184 define a slot 190 configured to receive a ring and maintain the ring in an upright position. In other embodiments, the interchangeable pads 184 define a flat surface 192 configured to receive a pendant and maintain the pendant in an upright position. In other embodiments, the interchangeable pads 184 define a hole 194 configured to receive an earring and maintain the earring in an upright position. In some embodiments, the jewelry tray 110 and the interchangeable pads 184 may be rotated or moved on the adjustable platform 106 such that the imaging device 108 may view the jewelry at different angles. In alternative embodiments, the interchangeable pads 184 may be configured to support any type of jewelry that enables the jewelry viewing stand 100 to operate as described herein.

In the illustrated embodiment, the interchangeable pads 184 include four styles of holder: (1) a small ring holder, (2) a large ring holder, (3) a necklace/earring holder, and (4) a loose stone insert that holds a small 4 Prong Gem/Diamond Gripper. Each of the different types of interchangeable pads 184 fits into a single jewelry tray 110. The jewelry tray 110 includes two rails (not shown) positioned inside the jewelry tray 110 to prevent the interchangeable pads 184 from getting pushed to the bottom of the jewelry tray 110 and to enable the interchangeable pads 184 to be easily removed. Both ring holders include a recessed box with padded sides that use friction to hold the ring in place when the ring is pushed into the slot 190. The necklace/earring holder includes a flat piece with two slits that hold the earring posts when the earring posts are pushed into the slits or secures a necklace chain so the pendant sits flat and may include a loop of hook and loop fastener to hold the chain in place. The loose stone insert includes a block with one vertical and one horizontal shaft that holds the 4 Prong Gem/Diamond Gripper. In alternative embodiments, the interchangeable pads 184 may include any style of jewelry holder that enables the jewelry tray 110 to be used as described herein. Additionally, the interchangeable pads 184 may have any size that enables the jewelry tray 110 to be used as described herein. The interchangeable pads 184 may have angling capabilities to position the jewelry in a desired position to view specific characteristics or identifying components. Furthermore, the interchangeable pads 184 may include a clasp or other holding mechanism for retaining the jewelry. For example, the interchangeable pads 184 may include an insert including a finger-like post that the ring can slide onto. In the illustrated embodiment, the interchangeable pads 184 are formed of fabric attached to rigid cardboard, formed plastic, and/or medium density fiberboard (MDF). The fabric may include a durable, metallic fabric. In alternative embodiments, the interchangeable pads 184 may be formed of any material that enables the jewelry tray 110 to be used as described herein. For example, the interchangeable pads 184 may be formed of cardboard, plastics, silicone, metal, foams, MDF, and/or wood.

The imaging device 108 may include any optical device that enables the jewelry viewing stand 100 to operate as described herein. For example, the imaging device 108 may include a camera, a computing device including a camera, a tablet including a camera, a smart phone including a camera, and/or any other device including an optical device. In some embodiments, the imaging device 108 may include a rear-facing camera that may be positioned over the adjustable platform 106. In the illustrated embodiment, the imaging device 108 includes a tablet including a camera. As shown in FIGS. 1 and 2, the stand 102 is sized and shaped to clasp a tablet and appropriately position the camera of the tablet within the imaging device notch 142 such that the camera of the tablet is positioned directly above the adjustable platform top platform 170. Additionally, in the illustrated embodiment, the imaging device 108 further includes an extra lens 196 that attaches to the imaging device 108 and improves the images taken by the imaging device 108. In the illustrated embodiment, the extra lens 196 includes a clip-on lens that is clipped onto the tablet over the camera. In alternative embodiments, the extra lens 196 may be any type of optical component that enables the jewelry viewing stand 100 to operate as described herein, and may be attached to the tablet, a phone, or other imaging device. The extra lens 196 enables the user to take close up images of the jewelry. However, some imaging devices 108 may have built-in macro lens capabilities and would not require the extra lens 196. If the focal length is less than approximately 90 mm (the distance between the top of the adjustable platform 106 and the top of the stand 102), an in-focus image can be viewed or taken. The adjustable platform 106 can also be raised to within approximately 20 mm of the top 124 of the stand 102 and in many scenarios can raise a piece of jewelry all the way to the extra lens 196. The extra lens 196 may have any magnification (e.g., 10×, 15×, 25×, 12×, 24×, 100×, 200×, and/or 400×).

In some embodiments, different types of lenses may be used. Different lenses may be used specifically for different types of photographs to obtain better images. For example, a 25× lens may be used for customer viewing, and a 100× lens may be used to shrink the focal area by an employee looking for characteristics that are harder to see. When taking photographs for chain of custody purposes, a lens at a lower magnification may provide a better photograph of the top of the diamond. The lens with lower magnification may show the inclusions or inscriptions for annotations in before and after photographs. Various levels of magnification may be used and are contemplated.

In addition, images of the entire piece of jewelry can be viewed or taken at 1× without the use of the extra lens 196. The magnifications listed above enable the imaging device 108 to view or take images of rings, bracelets, earrings, necklaces, pendants, loose stones, and/or watches. Additionally, the extra lens 196 may be used to view or take images of diamonds, gemstones, serial numbers, metal hallmarks, engravings, damage, or used for inspections. A focal length of the extra lens 196 is determined by a number of factors including the imaging device's 108 camera(s) and its built-in lens or lenses, the type of external lens being used (macro, wide angle, zoom, etc.), how far away the external lens is from the imaging device's 108 camera (this may vary due to thicknesses of protective cases). The user adjusts the adjustable knob 178 of the adjustable platform 106 to find the proper distance for the image to be in focus. In some embodiments, the imaging device 108 may include software that directs the user how to arrange the components of the jewelry viewing stand 100 to obtain a viewable image of the jewelry. In some embodiments, multiple pieces of jewelry may be viewed at the same time provided the pieces of jewelry are all located the same distance from the imaging device's 108 camera such that all of the pieces of jewelry are in focus.

Additionally, in the illustrated embodiment, the jewelry viewing stand 100 further includes at least one light source to provide light on the jewelry to improve the image in the imaging device 108. Light can be incorporated into the jewelry viewing stand 100 from one or more angles, either as a separate apparatus from the jewelry viewing stand 100 or directly incorporated into or connected to the jewelry viewing stand 100. For example, the light may be a portable light source that is not attached to the jewelry viewing stand 100 and which can be moved around the jewelry 112 to provide light from different directions and angles. In another example, light can be incorporated as an attachable light, which can be attached and removed from a tablet or the adjustable base. In another example, light can be incorporated as top lighting only. In another example, light can be incorporated as bottom lighting only. In another example, light can be incorporated as top lighting and as bottom lighting. For example, a light may be incorporated into or with a 100× magnification lens or into the jewelry viewing stand 100 itself to facilitate top lighting for better viewing of an inscription in the jewelry. In another example, a portable light may be positioned on the jewelry viewing stand 100 with a 25× magnification lens or less to provide back lighting. Back lighting can provide better viewing, for example, of inclusions in a diamond. In another example, a light source may be configured on the adjustable base, directing light on the jewelry. In another example, the light source may be attached to the adjustable base to shine light up to be reflected off an iPad (or other camera) to more evenly light the jewelry. As such the light source may be an indirect light source used to brighten the image. In another example, a side mounted light source may provide light from a side of the jewelry. Other light source attachments, angles, and configurations are contemplated.

In the illustrated embodiment, the jewelry viewing stand 100 is configured in a horizontal configuration such that the jewelry viewing stand 100 is configured to be positioned on a flat surface (such as a table or a jewelry display case). In alternative embodiments, the jewelry viewing stand 100 may be positioned in a vertical or angled configuration to enable the buyer to view the screen of the imaging device 108 when the buyer is comfortably seated. For example, the illustrated horizontal configuration enables a buyer that is standing next to a jewelry display to look down at the imaging device 108 on the jewelry viewing stand 100 and easily view the image on the screen. The vertical configuration enables a buyer that is comfortably seated at a table to easily view the screen without moving into a new position. The jewelry viewing stand 100 may include a stand (not shown) or may be attached to a separate stand (not shown) that orients the jewelry viewing stand 100 in the vertical configuration. Additionally, the angled configuration also enables a buyer that is comfortably seated at a table to easily view the screen without moving into a new position. The stand (not shown) or the separate stand (not shown) may also be configured to orient the jewelry viewing stand 100 in the angled configuration. The angled configuration may angle the jewelry viewing stand 100 at any angle including up to about 45°.

During operations, a potential buyer and/or a jeweler selects a piece of jewelry 112 to view for further inspection. The stand 102 is positioned proximate the buyer and/or the jeweler and the imaging device 108 is positioned in the stand 102. Specifically, the jeweler and/or the buyer pull the clamp movable jaw 156 open and position the imaging device 108 between the clamp movable jaw 156 and the clamp stationary jaw 136 such that the camera of the imaging device 108 is positioned within the imaging device notch 142 directly above the adjustable platform top platform 170. The jeweler and/or the buyer release the clamp movable jaw 156 and the clamp actuation mechanism pulls the clamp movable jaw 156 toward the clamp stationary jaw 136 such that the clamp movable jaw 156 and the clamp stationary jaw 136 clasp the imaging device 108. The jeweler and/or the buyer may then attach the extra lens 196 to the imaging device 108.

The jeweler and/or the buyer then opens the drawer 132 and removes at least one jewelry tray 110 and an appropriate interchangeable pad 184 for the jewelry 112 being viewed from the drawer 132. The jeweler and/or the buyer inserts the interchangeable pad 184 in the jewelry tray 110 and arranges the jewelry 112 on the interchangeable pad 184. The jeweler and/or the buyer then position the jewelry tray 110, the interchangeable pad 184, and the jewelry 112 on the adjustable platform top platform 170 and the adjustable platform 106 is adjusted to focus the imaging device 108. Specifically, the jeweler and/or the buyer turns the adjustable knob 178 to move the adjustable platform top platform 170, the jewelry tray 110, the interchangeable pad 184, and the jewelry 112 up or down as needed. The imaging device 108 then takes pictures or videos of the jewelry 112 as needed. In some embodiments, the imaging device 108 includes a screen and the jeweler and/or the buyer can view close up images or videos of the jewelry 112 in real time. Specifically, the jeweler and/or the buyer may be able to move the jewelry 112 beneath the imaging device 108 and the screen may display the images or videos as the jewelry 112 is moved to enable the jeweler and/or the buyer to view the sparkle of the jewelry 112 close up and in real time.

In some embodiments, the imaging device 108 may include software that directs the user on how to set up and operate the jewelry viewing stand 100 to obtain images of the jewelry. For example, the software may direct the user to rotate the adjustable knob 178 or put on the extra lens 196 to obtain the proper image. Additionally, in some embodiments, the software may enable the user to take pictures and/or videos, drop pins onto the image, and/or annotate the image. Additionally, the software may include artificial intelligence capabilities that may assist the user with identifying the jewelry, selling the jewelry, and/or annotating the jewelry. In alternative embodiments, the software may be any software that enables the jewelry viewing stand 100 to operate as described herein.

Figure 8:
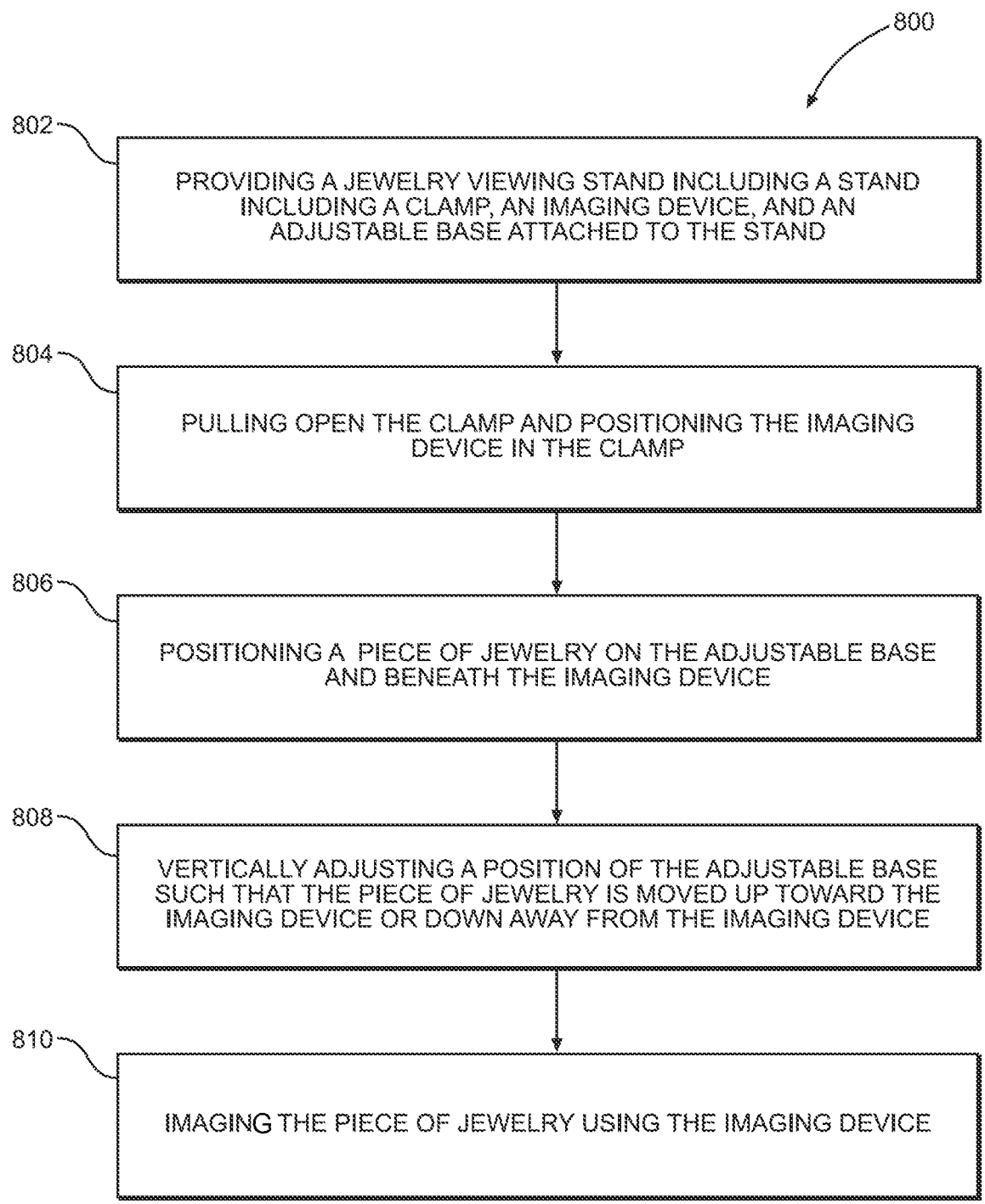
FIG. 8 illustrates a flow diagram of a method of viewing jewelry in accordance with aspects of the present disclosure.

FIG. 8 illustrates a flow diagram of a method 800 of viewing jewelry. The method includes providing 802 a jewelry viewing stand including a stand including a clamp, an imaging device, and an adjustable base attached to the stand. The method further includes pulling 804 open the clamp and positioning the imaging device in the clamp. The method also includes positioning 806 a piece of jewelry on the adjustable base and beneath the imaging device. The method further includes vertically adjusting 808 a position of the adjustable base such that the piece of jewelry is moved up toward the imaging device or down away from the imaging device. Adjusting the base may be performed in the method also includes imaging 810 the piece of jewelry using the imaging device.

The jewelry viewing stands described herein enable a user to closely inspect and view jewelry. For example, the jewelry viewing stands described herein may enable a jewelry retailer to display jewelry to a potential buyer in great detail to close a sale. Additionally, the jewelry viewing stands described herein may also enable a jeweler that repairs jewelry to closely inspect jewelry to determine how best to repair the jewelry. Accordingly, the jewelry viewing stands described herein may enable jewelers to inspect and display jewelry in a unique manner such that sales of jewelry increase, and repairs of jewelry are easier to complete.

Specifically, in some embodiments, the jewelry viewing stand includes a stand, a platform base, an adjustable platform, an imaging device, and at least one insertable pad. The stand includes a drawer for containing some of the components of the jewelry stand and a clamp positioned on top of the drawer for holding the imaging device in place above the platform base, the adjustable platform, and the insertable pad. The imaging device then takes close up pictures or videos of jewelry that has been placed in the insertable pad beneath the imaging device. The adjustable platform is moved up and down to improve the pictures or videos. The pictures or videos are then viewed by the jeweler and/or potential buyer. In the retail setting, the pictures or videos enable the buyer to examine the clarity, cut, carat, and color of gems of the jewelry, improving the buyer's appreciation of the jewelry and increasing the likelihood of a sale. In the repair setting, the pictures or videos enable the jeweler to closely inspect the jewelry and quickly determine how best to proceed with repairs. Accordingly, the jewelry viewing stands described herein may enable jewelers to inspect and display jewelry in a unique manner such that sales of jewelry increase, and repairs of jewelry are easier to complete.

Terminology and Interpretative Conventions

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

What is claimed:

1. A jewelry viewing stand comprising:
    a stand;
    an imaging device configured to image a piece of jewelry, wherein the stand is configured to hold and position the imaging device; and
    an adjustable base attached to the stand and positioned beneath the imaging device, wherein the adjustable base is configured to move the piece of jewelry toward and away from the imaging device while the stand maintains the imaging device in a stable, stationary position, wherein the stand comprises a clamp, and wherein the clamp comprises a movable jaw and a stationary jaw.

2. The jewelry viewing stand of claim 1, wherein the jewelry viewing stand comprises at least one light source.

3. The jewelry viewing stand of claim 1, wherein the adjustable base comprises a scissor lifting mechanism.

4. The jewelry viewing stand of claim 3, wherein the scissor lifting mechanism comprises scissor legs and a screw mechanism, wherein the screw mechanism is configured to actuate the scissor legs and the scissor legs are configured to vertically adjust the piece of jewelry.

5. The jewelry viewing stand of claim 1, wherein the clamp further comprises a spring mechanism configured to automatically actuate the movable jaw toward the stationary jaw.

6. A jewelry viewing stand comprising: a stand including a clamp;

an imaging device configured to image a piece of jewelry, wherein the clamp is configured to hold and position the imaging device, and wherein the imaging device comprises a tablet; and an adjustable base attached to the stand and positioned beneath the imaging device, wherein the adjustable device is configured to move the piece of jewelry vertically toward and away from the imaging device while the clamp maintains the imaging device in a stable, stationary position, wherein the clamp comprises a movable jaw and a stationary jaw.

7. The jewelry viewing stand of claim 6, wherein the jewelry viewing stand comprises a light source.

8. The jewelry viewing stand of claim 7, wherein the adjustable base comprises a scissor lifting mechanism.

9. The jewelry viewing stand of claim 8, wherein the scissor lifting mechanism comprises scissor legs and a screw mechanism, wherein the screw mechanism is configured to actuate the scissor legs and the scissor legs are configured to vertically adjust the piece of jewelry.

10. The jewelry viewing stand of claim 6, wherein the clamp further comprises a spring mechanism configured to automatically actuate the movable jaw toward the stationary jaw.

11. The jewelry viewing stand of claim 6, further comprising an extra lens attached to the tablet.

12. A method of viewing jewelry, the method comprising:

providing a jewelry viewing stand comprising a stand including a clamp, an imaging device, and an adjustable base attached to the stand;

pulling open the clamp and positioning the imaging device in the clamp;

positioning a piece of jewelry on the adjustable base and beneath the imaging device; vertically adjusting a position of the adjustable base such that the piece of jewelry is moved up toward the imaging device or down away from the imaging device; and imaging the piece of jewelry using the imaging device, wherein the clamp comprises a movable jaw and a stationary jaw, and wherein pulling open the clamp comprises pulling open the movable jaw.

13. The method of claim 12, wherein the adjustable base comprises a lifting mechanism, and wherein vertically adjusting a position of the adjustable base such that the piece of jewelry is moved up toward the imaging device or down away from the imaging device comprises vertically adjusting a position of the adjustable base such that the piece of jewelry is moved up toward the imaging device or down away from the imaging device with the lifting mechanism.

14. The method of claim 13, wherein the lifting mechanism comprises a scissor lifting mechanism, and wherein vertically adjusting a position of the adjustable base such that the piece of jewelry is moved up toward the imaging device or down away from the imaging device comprises vertically adjusting a position of the adjustable base such that the piece of jewelry is moved up toward the imaging device or down away from the imaging device with the scissor lifting mechanism.

15. The method of claim 14, wherein the scissor lifting mechanism comprises scissor legs and a screw mechanism, and wherein vertically adjusting a position of the adjustable base such that the piece of jewelry is moved up toward the imaging device or down away from the imaging device comprises vertically adjusting a position of the adjustable base such that the piece of jewelry is moved up toward the imaging device or down away from the imaging device with the screw mechanism such that the scissor legs are actuated and vertically adjust the position of the adjustable base.

16. The method of claim 12, wherein the clamp further comprises a spring mechanism configured to automatically actuate the movable jaw toward the stationary jaw, and wherein the method further comprises releasing the movable jaw to clamp the imaging device onto the stand.

* * * * *